US005093898A

United States Patent [19]

van Konynenburg et al.

[11] Patent Number: 5,093,898

[45] Date of Patent: * Mar. 3, 1992

[54] ELECTRICAL DEVICE UTILIZING CONDUCTIVE POLYMER COMPOSITION

[75] Inventors: Peter H. van Konynenburg, Palo Alto; Andrew Au, Fremont, both of Calif.

[73] Assignee: Raychem Corporation, Menlo Park, Calif.

[ * ] Notice: The portion of the term of this patent subsequent to Jun. 19, 2007 has been disclaimed.

[21] Appl. No.: 655,876

[22] Filed: Feb. 14, 1991

Related U.S. Application Data

[60] Continuation of Ser. No. 461,199, Jan. 5, 1990, Pat. No. 5,025,131, which is a division of Ser. No. 423,585, Sep. 27, 1981, Pat. No. 4,953,156, which is a continuation-in-part of Ser. No. 300,709, Sep. 9, 1981, abandoned.

[51] Int. Cl.[5] ............................................ H01G 9/04

[52] U.S. Cl. .................................... 392/451; 392/485; 219/206; 219/505; 219/552; 338/22 R; 123/557

[58] Field of Search ................ 392/451, 485; 219/205, 219/206, 505, 548, 549, 552; 338/22 R, 212, 214; 123/549, 557; 210/184, 186

[56] References Cited

U.S. PATENT DOCUMENTS

| | | | |
|---|---|---|---|
| 3,823,217 | 7/1974 | Kampe | 264/105 |
| 3,935,159 | 1/1976 | Demillecamps et al. | 260/42.27 |
| 3,962,373 | 6/1976 | Petrucelli | 260/900 |
| 4,237,441 | 12/1980 | van Konynenburg et al. | 338/22 R |
| 4,251,432 | 2/1981 | Martin | 260/42.14 |
| 4,304,987 | 12/1981 | van Konynenburg | 219/553 |
| 4,328,151 | 5/1982 | Robinson | 523/205 |

FOREIGN PATENT DOCUMENTS

| | | |
|---|---|---|
| 1805906 | 6/1969 | Fed. Rep. of Germany . |
| 2443123 | 11/1979 | France . |
| 1373711 | 11/1974 | United Kingdom . |
| 1449261 | 9/1976 | United Kingdom . |
| 1469311 | 4/1977 | United Kingdom . |
| 1469312 | 4/1977 | United Kingdom . |
| 2075992A | 11/1981 | United Kingdom . |

*Primary Examiner*—Bruce A. Reynolds
*Assistant Examiner*—John A. Jeffery
*Attorney, Agent, or Firm*—Herbert G. Burkard; Timothy H. P. Richardson; Marguerite E. Gerstner

[57] ABSTRACT

Conductive polymer compositions based on polyvinylidene fluoride have improved properties when the polyvinylidene fluoride has a very regular structure which can be characterized by a low head-to-head content in the repeating units. The improved properties include electrical stability when contacted by organic fluids and/or when maintained at elevated temperatures in air. Such compositions which exhibit PTC behavior are particularly useful in the form of self-limiting heaters which are immersed in organic fluds, especially flexible strip heaters for heating diesel fuel before it passes through a fuel filter.

13 Claims, 2 Drawing Sheets

ELECTRICAL DEVICE UTILIZING CONDUCTIVE POLYMER COMPOSITION

BACKGROUND OF THE INVENTION

1. Field of the Invention

This invention relates to conductive polymer PTC compositions and devices comprising them.

2. Introduction to the Invention

Conductive polymer compositions, and devices comprising them, are known. Reference may be made for example to U.S. Pat. Nos. 2,978,665, 3,243,753, 3,351,882, 3,571,777, 3,793,716, 3,823,217, 3,861,029, 4,017,715, 4,177,376, 4,188,276, 4,237,441, 4,238,812, 4,242,573, 4,246,468, 4,255,698 and 4,388,607, 4,426,339, 4,538,889, and 4,560,498; U.K. Patent No. 1,534,715; the article entitled "Investigations of Current Interruption by Metal-filled Epoxy Resin" by Littlewood and Briggs in J. Phys D: Appl. Phys, Vol. II, pages 1457-1462; the article entitled "The PTC Resistor" by R. F. Blaha in Proceedings of the Electronic Components Conference, 1971; the report entitled "Solid State Bistable Power Switch Study" by H. Shulman and John Bartho (August 1968) under Contract NAS-12-647, published by the National Aeronautics and Space Administration; J. Applied Polymer Science 19, 813-815 (1975), Klason and Kubat; Polymer Engineering and Science 18, 649-653 (1978) Narkis et al; and commonly assigned U.S. Ser. Nos. 601,424 (Moyer), now abandoned, published as German OLS 2,634,999. For details of more recent developments in this field, reference may be made to copending and commonly assigned U.S. Ser. Nos. 67,207 (Doljack et al.), now abandoned in favor of a continuation-in-part application Ser. No. 228,347, now U.S. Pat. No. 4,450,496, 98,711 (Middleman et al.), now U.S. Pat. No. 4,315,237, 141,984 (Gotcher et al.), now abandoned now U.S. Pat. No. 4,413,301, 141,988 now abandoned 141,989 (Evans), 141,991 (Fouts et al.), now U.S. Pat. No. 4,545,926, 142,053 (Middleman et al.), now U.S. Pat. No. 4,352,083, 142,054 (Middleman et al.), now U.S. Pat. No. 4,317,027, 150,909 (Sopory), now abandoned 150,910 (Sopory), now U.S. Pat. No. 4,334,351, 150,911 (Sopory), now U.S. Pat. No. 4,318,881, 174,136 (Cardinal et al.), now U.S. Pat. No. 4,314,230, 176,300 (Jensen), now U.S. Pat. No. 4,330,704, 184,647 (Lutz), now abandoned 250,491 (Jacobs et al.), now abandoned 254,352 (Taylor), now U.S. Pat. No. 4,426,633, 272,854 (Stewart et al.), now abandoned in favor of a continuation-in-part application Ser. No. 403,203, now U.S. Pat. No. 4,502,929, 273,525 (Walty), now U.S. Pat. No. 4,398,084, and 274,010 (Walty et al.), now abandoned. The disclosure of each of the patents, publications and applications referred to above is incorporated herein by reference.

Electrical devices containing conductive polymers generally (though not invariably) comprise an outer jacket, usually of insulating material, to protect the conductive polymer from damage by the surrounding environment. However, if no protective jacket is used, or if the jacket is permeable to harmful species in the environment, or if the conditions of use are such that the jacket may become damaged, it is necessary or desirable to select a conductive polymer which is not damaged (or which deteriorates at an acceptably low rate) when exposed to the surrounding environment. Exposure of conductive polymers to organic fluids generally results in an increase in resistivity; exposure to air, especially at elevated temperatures between room temperature and 35° C. below the melting point generally results in a decrease in resistivity both at the elevated temperature and at room temperature (a phenomenon known in the art as "resistance relaxation").

SUMMARY OF THE INVENTION

We have discovered that PTC conductive polymer compositions which are based on polyvinylidene fluoride exhibit substantially improved stability if the polyvinylidene fluoride has a very regular structure which can be characterized by a low head-to-head content in the repeating units. Polyvinylidene fluoride is made up of repeating units of formula —$CH_2CF_2$—, which can be arranged head-to-tail (i.e. —$CH_2CF_2$—$CH_2CF_2$—) or head-to-head (i.e. —$CH_2CF_2$—$CF_2CH_2$—), and we have found that the lower the head-to-head content, the greater the stability of the resistivity of the composition when exposed to organic fluids and/or when exposed to air at elevated temperature. Previously known conductive polymer compositions based on polyvinylidene fluoride have made use of polyvinylidene fluoride of relatively high head-to-head content, namely at least 5.2% and generally higher, which are easier to process than the polymers used in the present invention.

The present invention provides an electrical device which comprises·

(i) a conductive polymer element composed of a conductive polymer composition which exhibits PTC behavior and which comprises polyvinylidene fluoride having a head-to-head content of less than 4.5%, and a particulate conductive filler dispersed in the polyvinylidene fluoride; and (ii) two electrodes which are in electrical contact with the conductive polymer element and which can be connected to a source of electrical power to cause current to flow through the conductive polymer element.

BRIEF DESCRIPTION OF THE DRAWING

The invention is illustrated in the accompanying drawing, in which.

DETAILED DESCRIPTION OF THE INVENTION

Figure 1:
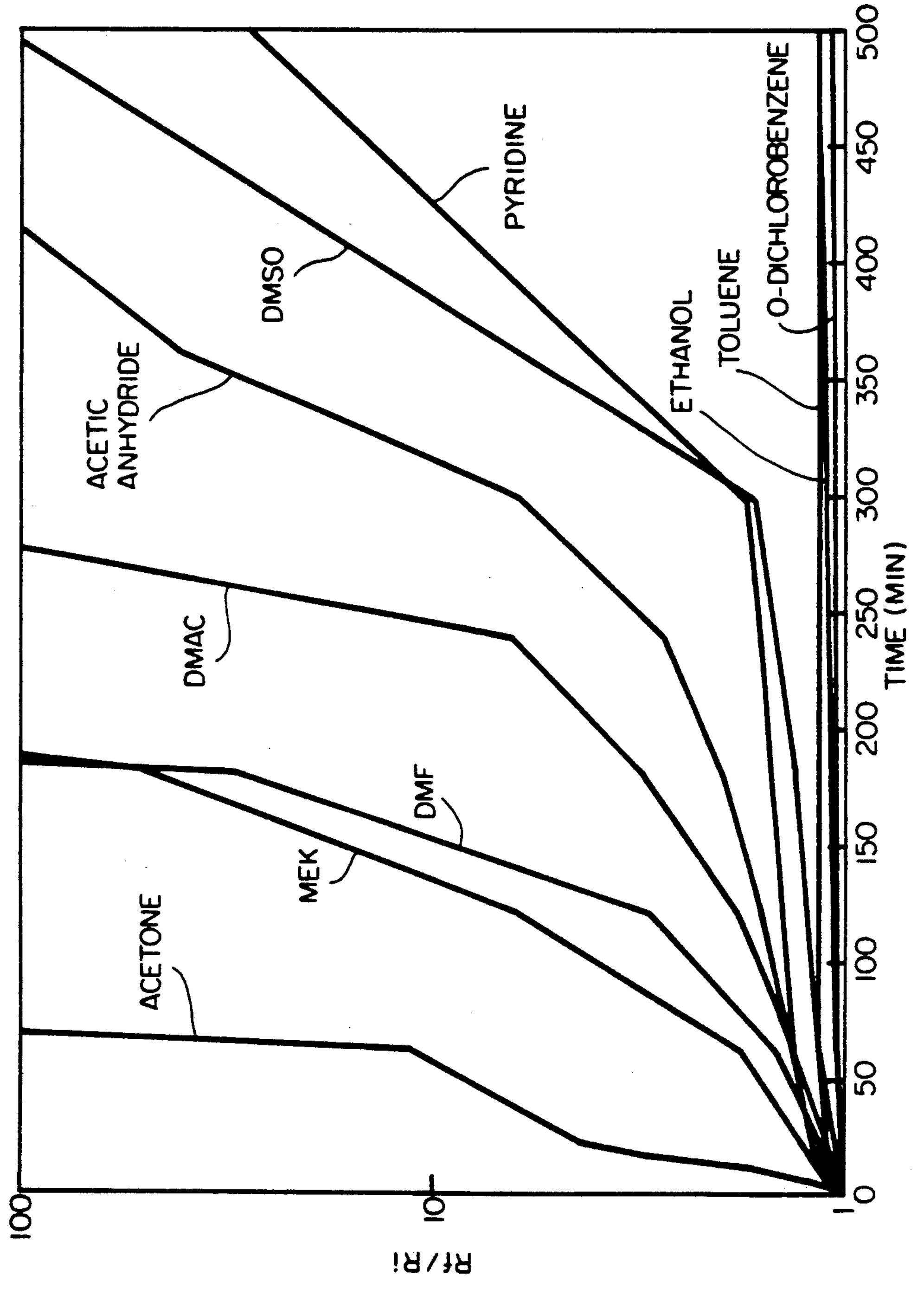
FIGS. 1 and 2 show the effect on resistivity of immersing two conductive polymer compositions in various organic solvents.

Polyvinylidene fluorides suitable for use in this invention are commercially available. The head-to-head content of a polyvinylidene fluoride can be measured by those skilled in the art. We have found that the measured head-to-head contents of different samples of a polymer sold under a particular trade name can differ substantially. In general, the presently available polyvinylidene fluorides made by suspension polymerization (rather than emulsion polymerization) have lower head-to-head contents. The number average molecular weight of the polymer is generally at least 5,000, e.g. 7,000 to 15,000.

The polyvinylidene fluoride is preferably a homopolymer of vinylidene fluoride, but the presence of small quantities of comonomers, (preferably less than 15%, particularly less than 5% by weight), e.g. tetrafluoroethylene, hexafluoropropylene and ethylene, is not excluded. The polyvinylidene fluoride is preferably the sole crystalline polymer in the composition, but other crystalline polymers, e.g. other crystalline fluoropolymers, may also be present. The composition may contain relatively small amounts (preferably less than 35%, especially less than 20%, particularly less than 10%, by volume) of one or more elastomeric polymers, particularly solvent-resistant fluorine-containing elastomers and acrylic elastomers, which are usually added primarily to improve the flexibility and elongation of the composition.

The particulate conductive filler preferably comprises carbon black, and often consists essentially of carbon black. Choice of the carbon black will influence the resistivity/temperature characteristics of the composition. A carbon black having a ratio of surface area ($m^2/g$) to particle size (mu) of 0.03 to 6.0 is preferred. The amount of conductive filler used will depend upon the desired resistivity of the composition. For flexible strip heaters which are to be used for heating diesel fuel and powered by a 12 volt battery, we prefer a PTC composition whose resistivity at 25° C. is less than 200 ohm.cm e.g. about 10 to about 100 ohm.cm. In such compositions the amount of carbon black may for example be 16 to 25% by weight. For circuit protection devices, as further discussed for example in U.S. Pat. Nos. 4,237,441 and 4,238,812 incorporated by reference herein, the resistivity of the PTC composition at 25° C. is preferably less than 10 ohm-cm, particularly less than 7 ohm-cm, and the conductive filler preferably comprises carbon black having a particle size D which is from 20 to 10 millimicrons and a surface area in $m^2/g$ such that S/D is not more than 10. In the circuit protection devices, the conductive polymer element preferably lies between two laminar electrodes such that, when the electrodes are connected to a source of electrical power, current flows through the PTC element over an area of equivalent diameter d with an average path length t such that d/t is at least 2.

In addition to one or more conductive fillers, the compositions may also comprise other conventional additives, such as non-conductive fillers (including flame retardants), antioxidants and crosslinking agents (or residues thereof if the composition has been cross-linked).

The compositions of the invention are preferably cross-linked (particularly by irradiation), since this has been found to enhance their resistance to organic solvents.

Preparation of the compositions of the invention can be carried out in conventional fashion. Often it will be convenient to melt-extrude the composition directly into a water bath (which may be heated), and using this technique subsequent annealing is often not required.

The invention is illustrated by the following Examples, in which Examples 1, 2, 3, 7, 12 and 13 are Comparative Examples not in accordance with the invention.

EXAMPLE 1

The ingredients listed for Composition A in Table 1 below were mixed in a Banbury mixer. The mixture was dumped, placed on a steam-heated mill and extruded into a water bath through a 3.5 inch (8.9 cm) extruder fitted with a pelletizing die. The extrudate was chopped into pellets which were dried for 16 hours at 80° C.

The ingredients listed for Composition B in Table 1 were mixed and pelletized in the same way as for Composition A.

83% by weight of the Composition A pellets and 17% by weight of the Composition B pellets were tumble blended and dried at 110° C. The composition of the resulting Final Blend is shown in Table 1. Using a 1.5 inch (3.8 cm) diameter extruder fitted with a crosshead die having an orifice 0.4 inch (1.0 cm)×0.1 inch (0.3 cm), the blend was melt-extruded over a pair of pre-heated 14 AWG (1.85 mm diameter) 19/27 nickel-coated copper wires with a center-to-center separation of 0.25 inch (0.64 cm). The extrudate was passed immediately through a bath of water at room temperature, air-dried, and then irradiated to a dosage of 10 Mrad. The conductive polymer had a resistivity of about 50 ohm.cm at 25° C.

TABLE 1

| | Composition B | | | Composition A | | | Final Blend | |
|---|---|---|---|---|---|---|---|---|
| | Wt (g) | Wt % | Vol % | Wt (g) | Wt % | Vol % | Wt % | Vol % |
| Kynar 460 | 16,798 | 72 | 72.6 | 16,339 | 70 | 70.6 | 71.7 | 72.3 |
| Furnex N765 | 4,433 | 19 | 18.7 | 4,901 | 21 | 20.7 | 19.3 | 19.0 |
| Viton AHV | 1,400 | 6 | 5.9 | 1,400 | 6 | 5.9 | 6.0 | 5.9 |
| Omya-BSH | 467 | 2 | 1.3 | 467 | 2 | 1.3 | 2.0 | 1.3 |
| TAIC | 233 | 1 | 1.5 | 233 | 1 | 1.5 | 1.0 | 1.5 |

Kynar 460 is polyvinylidene fluoride available from Pennwalt and having a head-to-head content of about 5.5%.
Furnex N765 is a carbon black available from Columbian Chemical having a particle size of about 60 millimicrons, a surface area of about 32 $m^2/g$ and a DBP value of about 112 $cm^3/100$ g.
Viton AHV is a copolymer of hexafluoropropylene and polyvinylidene fluoride manufactured by du Pont.
Omya-BSH is calcium carbonate available from Omya Inc.
TAIC is triallyl isocyanurate, a radiation cross-linking agent.

EXAMPLES 2-6

The ingredients listed for Examples 2 to 6 in Table 2 below were mixed in a Banbury mixer. The mixture was dumped, granulated and dried for 72 hours at 75° C. under vacuum. Using a 0.75 inch (1.9 cm) single screw extruder fitted with a cross-head die having an orifice 0.3 inch (0.76 cm)×0.1 inch (0.3 cm), the blend was melt-extruded over a pair of pre-heated 18 AWG (1.2 mm diameter) 19/27 nickel-coated copper wires with a center-to-center separation of 0.25 inch (0.64 cm). The extrudate was passed immediately through a bath of water at room temperature, air-dried, and then irradiated to a dosage of 10 Mrad.

EXAMPLES 7-15

The ingredients shown for Examples 7-15 in Table 2 were mixed in a Banbury mixer, dumped and then granulated. The granulated materials were molded into slabs of thicknesses of 0.030" (0.076 cm) to 0.036" (0.091 cm) by compression molding at 200° C. for three minutes.

TABLE 2

| | Ex. No. | | | | | | | | | | | | | |
|---|---|---|---|---|---|---|---|---|---|---|---|---|---|---|
| Ingredients | 2C | 3C | 4 | 5 | 6 | 7C | 8 | 9 | 10 | 11 | 12C | 13C | 14 | 15 |
| Kynar 450 | 77 | | | | | 90 | | | | | 88 | | | |
| Kynar 460 | | 77 | | | | | | | | | | 89 | | |
| Solef 1010 | | | 74 | | | | 88.5 | 88 | | | | | | |
| KF 1100 | | | | 74 | | | | | 89.5 | | | | | 88.5 |
| KF 1000 | | | | | 77 | | | | | | | | | |

TABLE 2-continued

| Ingredients | Ex. No. 2C | 3C | 4 | 5 | 6 | 7C | 8 | 9 | 10 | 11 | 12C | 13C | 14 | 15 |
|---|---|---|---|---|---|---|---|---|---|---|---|---|---|---|
| Dyflor 2000M | | | | | | | | | | 89.5 | | | 88.5 | |
| Statex G | 21 | 21 | 24 | 24 | 21 | | | | | | | | | |
| Vulcan XC72 | | | | | | 8 | 9.5 | 10 | 8.5 | 8.5 | 10 | 9 | 9.5 | 9.5 |
| Omya BSH | 2 | 2 | 2 | 2 | 2 | 2 | 2 | 2 | 2 | 2 | 2 | 2 | 2 | 2 |
| Resistivity (ohm-cm) at 25° C. | | | | | | $3.1 \times 10^4$ | $1.6 \times 10^4$ | 1800 | 1850 | 2000 | 288 | 298 | 200 | 134 |

Kynar 450 is polyvinylidene fluoride available from Pennwalt and having a head-to-head content in the range 5.5 to 6.3.
Solef 1010 is a polyvinylidene fluoride available from Solvay et cie of Belgium, and having a head-to head content of 4.1%.
KF1000 and KF1100 are polyvinylidene fluorides available from Kureha Chemical Industry Co. of Japan, and having a head-to-head content of 3.5 to 3.8%.
Statex G is a carbon black available from Cities Services Co., Columbian Division having a particle size of about 60 millimicrons, a surface area of about 32 $m^2/g$ and a DBP value of about 90 $cm^3/100$ g.
Dyflor 2000 M is a polyvinylidene fluoride available from Kay-Fries, Inc., member of Dynamit Nobel Chemikalien of Federal Republic of Germany and having a head-to-head content of about 4.4–4.9.
Vulcan XC-72 is a carbon black available from Cabot Co., having a particle size of about 30 millimicrons, a surface area of about 224 $m^2/g$ and a DBP value of about 178 $cm^3/100$ g.

TESTS FOR STABILITY IN ORGANIC SOLVENTS

The extrudates obtained in Examples 1 and 4 were compared by the following tests. Samples 2 inch (5.1 cm) long were cut from the extrudates. The samples were immersed in various solvents at 25° C. and the resistance of the samples was measured at intervals. The solvents used, and their solubility parameters, were

| Solvent | Solubility Parameter $(cal/cm^3)^{0.5}$ |
|---|---|
| Toluene | 8.9 |
| Methylethylketone (MEK) | 9.3 |
| Acetone | 9.9 |
| o-dichlorobenzene | 10.0 |
| Acetic Anhydride | 10.3 |
| Pyridine | 10.7 |
| Dimethylacetamide (DMAC) | 10.8 |
| Dimethylsulphoxide (DMSO) | 12.0 |
| Dimethylformamide (DMF) | 12.1 |
| Ethanol | 12.7 |

Figure 2:
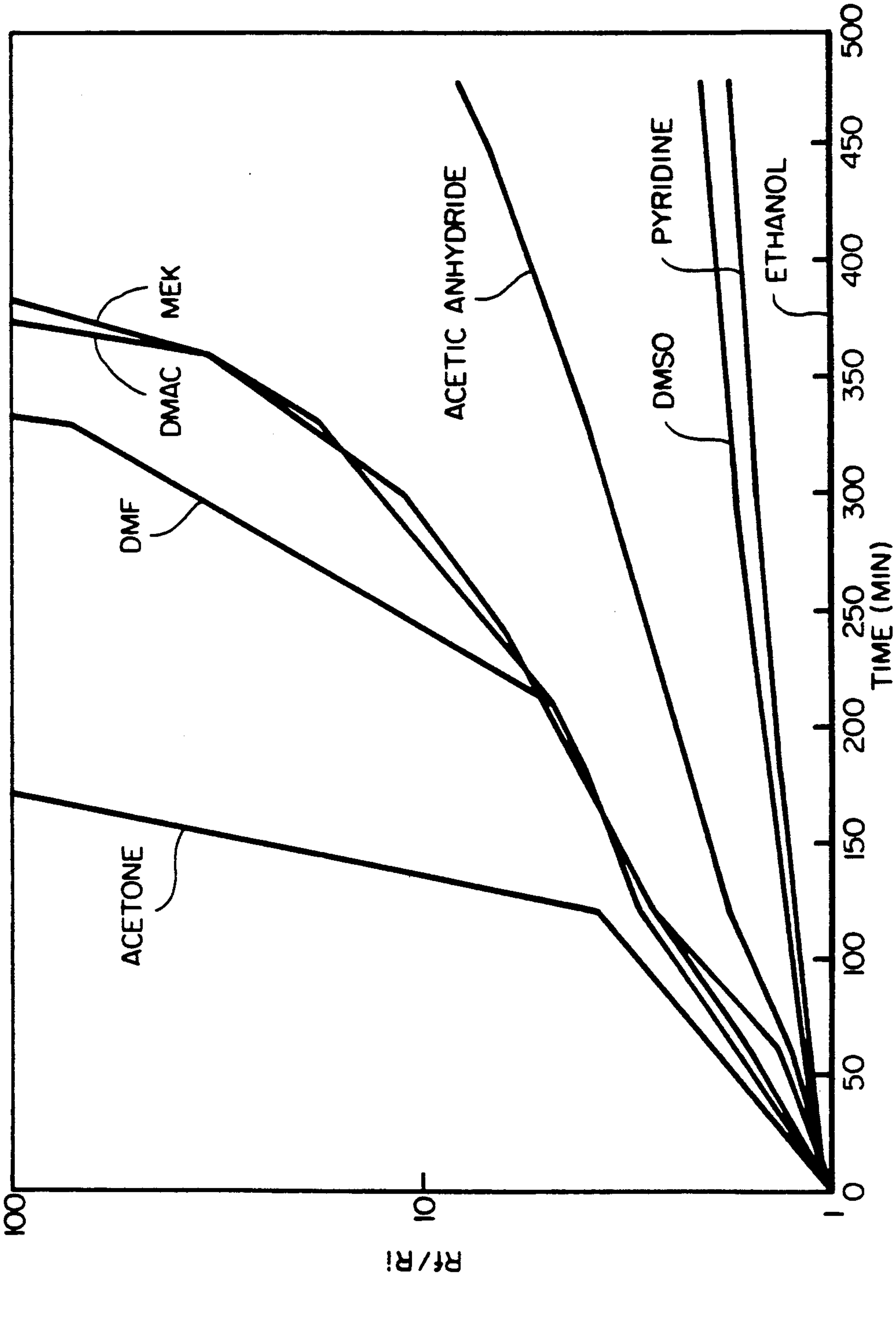

The results for Examples 1 and 4 are shown in FIGS. 1 and 2 respectively of the accompanying drawings, where the ratio of the resistance at a given time ($R_f$) to the initial resistance ($R_i$) is plotted against time. The greater stability of the composition of the invention (Example 4, shown in FIG. 2) is apparent.

The extrudates obtained in Examples 1 to 6 were compared in the following way. Samples 2 inch (5.1 cm) long were cut from the extrudates and were immersed in various test liquids maintained at 160° F. (71° C.). The test liquids are listed below and include diesel fuel and various commercially available additives for diesel fuel alone and mixed with diesel fuel. At intervals, the samples were removed, cooled to 25° C. and dried, and their resistance measured. Table 3 shows the value of the ratio $R_f/R_i$ for the different samples at various times. The additives tested, and their main ingredients, were as follows:

B12: Toluene, methanol, acetone, naphthalenic mineral oil and ethylene glycol monobutylether.

Fire Prep 100: Naphthalenic oil and partly oxidised aliphatic hydrocarbon

Sta-Lube: Naphthalenic mineral oil

Redline and Catalyst: Naphthalenic mineral oil, barium carbonate other inorganic carbonates, and sulfur-containing material Wynn's Conditioner: Naphthalenic mineral oil/and isopropanol Gumout: Naphthalenic mineral oil, non-aromatic ester and aliphatic acid.

Wynn's Anti-Knock: Naphthalenic mineral oil, non-aromatic ester, aliphatic amide, and aliphatic acid.

FPPF: Ethyl cellulose, ethylene glycol monobutylether, and oxidised hydrocarbons.

TABLE 3

| | Example No. 1C(C) | 2(C) | 3(C) | 4 | 5 | 6 |
|---|---|---|---|---|---|---|
| $R_i$ (ohms) | 9.3 | 8.8 | 2.3 | 14.1 | 19.7 | 10.4 |
| $R_f/R_i$ after 19 hours in | | | | | | |
| B12 | $23 \times 10^4$ | $28 \times 10^4$ | $43 \times 10^4$ | $3.3 \times 10^4$ | 133 | 339 |
| Fire Prep 1000 | 1.02 | 1.04 | 0.96 | 0.91 | 0.94 | 0.92 |
| Sta-Lube | 1.09 | 1.04 | 1.11 | 0.94 | 0.95 | 0.91 |
| Red-line Catalyst | 1.22 | 1.06 | 1.33 | 1.00 | 0.97 | 1.05 |
| Wynn's Conditioner | 1.39 | 1.18 | 1.19 | 1.13 | 1.08 | 1.15 |
| Gumout | 1.14 | 1.10 | 1.22 | 1.01 | 1.01 | 1.08 |
| Wynn's Anti Knock | 1.12 | 1.04 | 1.18 | 0.99 | 1.00 | 1.09 |
| $R_f/R_i$ after 110 hours in | | | | | | |
| Diesel Fuel | 1.03 | 0.97 | 1.07 | 0.93 | 1.00 | 0.92 |
| $R_f/R_i$ after 69 hours in | | | | | | |
| Diesel Fuel + 7% B12 | 1.26 | 1.10 | 1.67 | 1.15 | 1.05 | 1.12 |
| Diesel Fuel + 7% FPPF | 1.32 | 1.12 | 1.20 | 1.08 | 1.05 | 1.12 |
| Diesel Fuel + 10% gasoline | 1.17 | 1.05 | 1.15 | 1.01 | 0.99 | 1.07 |

TABLE 3-continued

| | Example No. | | | | | |
|---|---|---|---|---|---|---|
| | 1C(C) | 2(C) | 3(C) | 4 | 5 | 6 |
| $R_f/R_i$ after 275 hours in Diesel Fuel | 1.09 | 1.01 | 1.12 | 0.95 | 0.93 | 1.04 |
| $R_f/R_i$ after 157 hours in | | | | | | |
| Diesel fuel + 7% B12 | 1.66 | 1.17 | 2.97 | 1.37 | 1.08 | 1.35 |
| Diesel Fuel + 7% FPPF | 1.78 | 1.30 | 1.47 | 1.17 | 1.14 | 1.27 |
| Diesel Fuel + 10% gasoline | 1.33 | 1.10 | 1.28 | 1.06 | 1.01 | 1.16 |

RESISTANCE RELAXATION TESTS

The compositions of Examples 7-15 were tested by the following tests. Samples 1 inch (2.54 cm) by 1.5 inch (3.8 cm) were cut from the molded slabs. Electrodes were formed on each sample by painting a strip 0.25 inch (0.62 cm) wide at each end with a suspension of silver particles (Electrodag 504 available from Acheson Colloids). The samples were annealed for 5 minutes at 200° C., and then cooled. The samples were then placed in an oven at 100° C. and their resistances measured at intervals. It was found that the lower the head-to-head content of the polymer, the less its change in resistance.

We claim:

1. An electrical device which comprises (i) a conductive polymer element composed of a conductive polymer composition which exhibits PTC behavior and which comprises polyvinylidene fluoride having a head-to-head content of less than 4.5%, and a particulate conductive filler dispersed in the polyvinylidene fluoride; and (ii) two electrodes which are in electrical contact with the conductive polymer element and which can be connected to a source of electrical power to cause current to flow through the conductive polymer element.

2. A device according to claim 1 wherein the polyvinylidene fluoride has a head-to-head content of less than 4.0%.

3. A device according to claim 1 wherein the conductive filler comprises carbon black.

4. A device according to claim 3 wherein the carbon black has a ratio of surface area in $m^2/g$ to particle size in millimicrons of 0.03 to 6.0.

5. A device according to claim 1 wherein the polyvinylidene fluoride is a homopolymer of vinylidene fluoride.

6. A device according to claim 1 wherein the conductive polymer also comprises another crystalline polymer.

7. A device according to claim 1 wherein the conductive polymer also comprises another crystalline fluoropolymer.

8. A device according to claim 1 wherein the conductive polymer composition also comprises up to 20% by volume of one or more elastomeric polymers.

9. A device according to claim 7 wherein the conductive polymer has been crosslinked by irradiation.

10. A device according to claim 1 wherein the conductive polymer element has been formed by melt extruding the conductive polymer composition.

11. A device according to claim 1 which is free from any outer insulating jacket.

12. A device according to claim 1 which is a circuit protection device and wherein the conductive polymer composition has a resistivity at 25° C. of less than 7 ohm.cm and the conductive filler comprises carbon black having a particle size D which is from 20 to 150 millimicrons and a surface area S in $m^2/g$ such that S/D is not more than 10.

13. A device according to claim 1 which is a circuit protection device wherein the conductive polymer composition has a resistivity at 25° C. of less than 10 ohm-cm and the conductive polymer element lies between two laminar electrodes such that, when the electrodes are connected to a source of electrical power, current flows through the PTC element over an area of equivalent diameter d with an average path length t such that d/t is at least 2.

* * * * *

UNITED STATES PATENT AND TRADEMARK OFFICE
CERTIFICATE OF CORRECTION

PATENT NO. : 5,093,898

Page 1 of 2

DATED : March 3, 1992

INVENTOR(S) : van Konynenburg et al

It is certified that error appears in the above-identified patent and that said Letters Patent is hereby corrected as shown below:

Cover Page, Abstract [57], line 10, replace "fluds" by --fluids--.

Column 1, line 5, before "BACKGROUND OF THE INVENTION", insert --CROSS-REFERENCE TO RELATED APPLICATION This application is a continuation of our copending, commonly assigned Application Serial No. 07/461,199, filed January 5, 1990, which is a divisional application of our Application Serial No. 06/423,589, filed September 27, 1982, now Patent No. 4,953,156 which is a continuation-in-part of our commonly assigned Application Serial No. 300,709 filed September 9, 1981, now abandoned. The entire disclosure of each of these patents and applications is incorporated herein by reference.--

Column 1, line 15, delete "and".

Column 1, line 37, after "abandoned" insert --141,987 (Middleman et al.)--.

UNITED STATES PATENT AND TRADEMARK OFFICE
CERTIFICATE OF CORRECTION

PATENT NO. : 5,093,898

DATED : March 3, 1992

INVENTOR(S) : van Konynenburg et al

It is certified that error appears in the above-identified patent and that said Letters Patent is hereby corrected as shown below:

Column 1, line 37, after "141,988" insert --(Fouts et al.)--

Column 8, claim 9, line 27, replace "claim 7" should read --claim 1--

Signed and Sealed this

Sixteenth Day of November, 1993

Attest:

Bruce Lehman

BRUCE LEHMAN

*Attesting Officer* *Commissioner of Patents and Trademarks*